(12) United States Patent
Sobecki

(10) Patent No.: US 12,534,021 B2
(45) Date of Patent: Jan. 27, 2026

(54) VEHICULAR DRIVER MONITORING SYSTEM WITH EYE TRACKING

(71) Applicant: Magna Mirrors of America, Inc., Holland, MI (US)

(72) Inventor: Justin E. Sobecki, Rockford, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 39 days.

(21) Appl. No.: 18/666,959

(22) Filed: May 17, 2024

(65) Prior Publication Data

US 2024/0383406 A1    Nov. 21, 2024

Related U.S. Application Data

(60) Provisional application No. 63/502,998, filed on May 18, 2023.

(51) Int. Cl.

| | |
|---|---|
| *B60R 1/12* | (2006.01) |
| *B60R 1/04* | (2006.01) |
| *H04N 23/21* | (2023.01) |
| *H04N 23/56* | (2023.01) |
| *H04N 23/72* | (2023.01) |
| *H04N 23/74* | (2023.01) |
| *H04N 23/75* | (2023.01) |

(52) U.S. Cl.
CPC .................. *B60R 1/12* (2013.01); *B60R 1/04* (2013.01); *H04N 23/21* (2023.01); *H04N 23/56* (2023.01); *H04N 23/72* (2023.01); *H04N 23/74* (2023.01); *H04N 23/75* (2023.01); *B60R 2001/1253* (2013.01)

(58) Field of Classification Search
CPC ..... B60R 1/12; B60R 1/04; B60R 2001/1253; H04N 23/21; H04N 23/56; H04N 23/72; H04N 23/74; H04N 23/75
See application file for complete search history.

(56) References Cited

U.S. PATENT DOCUMENTS

| | | | |
|---|---|---|---|
| 5,140,455 | A | 8/1992 | Varaprasad et al. |
| 5,253,109 | A | 10/1993 | O'Farrell et al. |
| 5,610,756 | A | 3/1997 | Lynam et al. |
| 5,668,663 | A | 9/1997 | Varaprasad et al. |
| 5,724,187 | A | 3/1998 | Varaprasad et al. |

(Continued)

*Primary Examiner* — Frank F Huang
(74) *Attorney, Agent, or Firm* — HONIGMAN LLP

(57) ABSTRACT

A vehicular driver monitoring system includes a vehicular interior rearview mirror assembly having a mirror head that accommodates a variable reflectance mirror reflective element, a driver monitoring camera and a near infrared light emitter. When the near infrared light emitter is electrically operated to emit near infrared, the near infrared light emitter emits near infrared light that illuminates at least a driver head region. While the variable reflectance mirror reflective element is operating in a first mode, and responsive to determination that visible light reflecting off glasses worn by the driver is obscuring the camera's view of the eyes of the driver, the vehicular driver monitoring system controls the variable reflectance mirror reflective element to reduce visible light transmissivity through the variable reflectance mirror reflective element to reduce visible light reflections at the glasses worn by the driver as captured in the image data captured by the driver monitoring camera.

32 Claims, 3 Drawing Sheets

(56) References Cited

U.S. PATENT DOCUMENTS

| | | | |
|---|---|---|---|
| 6,154,306 A | 11/2000 | Varaprasad et al. | |
| 6,198,409 B1* | 3/2001 | Schofield | B60R 1/12 |
| | | | 340/436 |
| 6,392,315 B1* | 5/2002 | Jones | F02P 17/12 |
| | | | 307/10.6 |
| 6,690,268 B2 | 2/2004 | Schofield et al. | |
| 6,720,920 B2* | 4/2004 | Breed | G01S 13/931 |
| | | | 342/357.31 |
| 7,079,017 B2* | 7/2006 | Lang | G01S 15/931 |
| | | | 340/436 |
| 7,184,190 B2 | 2/2007 | McCabe et al. | |
| 7,195,381 B2 | 3/2007 | Lynam et al. | |
| 7,255,451 B2 | 8/2007 | McCabe et al. | |
| 7,274,501 B2 | 9/2007 | McCabe et al. | |
| 7,579,940 B2* | 8/2009 | Schofield | B60R 11/0235 |
| | | | 701/487 |
| 7,626,749 B2 | 12/2009 | Baur et al. | |
| 7,914,187 B2 | 3/2011 | Higgins-Luthman et al. | |
| 8,508,383 B2 | 8/2013 | Peterson et al. | |
| 9,405,120 B2 | 8/2016 | Graf et al. | |
| 9,598,016 B2 | 3/2017 | Blank et al. | |
| 10,017,114 B2 | 7/2018 | Bongwald | |
| 10,065,574 B2 | 9/2018 | Tiryaki | |
| 10,958,830 B2 | 3/2021 | Koravadi | |
| 11,518,401 B2 | 12/2022 | Kulkarni | |
| 11,582,425 B2 | 2/2023 | Liu | |
| 11,639,134 B1 | 5/2023 | Huizen et al. | |
| 11,780,372 B2 | 10/2023 | Sobecki et al. | |
| 11,827,153 B2 | 11/2023 | Miller et al. | |
| 2002/0167589 A1* | 11/2002 | Schofield | B60R 1/26 |
| | | | 348/E7.086 |
| 2005/0134983 A1* | 6/2005 | Lynam | B60R 1/12 |
| | | | 359/872 |
| 2007/0073473 A1* | 3/2007 | Altan | G01S 13/862 |
| | | | 701/518 |
| 2007/0181810 A1* | 8/2007 | Tan | G01S 7/4811 |
| | | | 250/341.1 |
| 2010/0139995 A1* | 6/2010 | Rudakevych | B62D 55/06 |
| | | | 180/9.32 |
| 2011/0063445 A1* | 3/2011 | Chew | G06V 20/52 |
| | | | 348/E7.085 |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2018/0222414 A1 | 8/2018 | Ihlenburg et al. | |
| 2018/0231976 A1 | 8/2018 | Singh | |
| 2019/0210615 A1 | 7/2019 | Caron et al. | |
| 2020/0143560 A1 | 5/2020 | Lu et al. | |
| 2020/0202151 A1 | 6/2020 | Wacquant | |
| 2020/0320320 A1 | 10/2020 | Lynam | |
| 2021/0291739 A1 | 9/2021 | Kasarla et al. | |
| 2021/0323473 A1 | 10/2021 | Peterson et al. | |
| 2022/0036473 A1* | 2/2022 | Thompson | G06Q 50/40 |
| 2022/0242438 A1 | 8/2022 | Sobecki et al. | |
| 2022/0254132 A1 | 8/2022 | Rother | |
| 2022/0377219 A1 | 11/2022 | Conger et al. | |
| 2024/0168355 A1 | 5/2024 | Baur | |
| 2024/0190456 A1 | 6/2024 | P et al. | |
| 2024/0383406 A1 | 11/2024 | Sobecki | |

\* cited by examiner

VEHICULAR DRIVER MONITORING SYSTEM WITH EYE TRACKING

CROSS REFERENCE TO RELATED APPLICATION

The present application claims the filing benefits of U.S. provisional application Ser. No. 63/502,998 filed May 18, 2023, which is hereby incorporated herein by reference in its entirety.

FIELD OF THE INVENTION

The present invention relates generally to a vehicular driver or occupant or cabin monitoring system for a vehicle and, more particularly, to a vehicular driver or occupant or cabin monitoring system that utilizes one or more cameras at an interior mirror of a vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting his or her rearward view.

SUMMARY OF THE INVENTION

A vehicular interior rearview mirror assembly includes a mirror head adjustably attached at a mounting structure. The mounting structure is configured to attach at an interior portion of a cabin of a vehicle equipped with the vehicular driver monitoring system. The mirror head accommodates a variable reflectance mirror reflective element. A driver monitoring camera is accommodated by the mirror head and the driver monitoring camera moves together and in tandem with the mirror head when, with the mounting structure attached at the interior portion of the cabin of the vehicle, the mirror head is adjusted relative to the mounting structure to set a rearward view of the driver of the vehicle. The driver monitoring camera views through the variable reflectance mirror reflective element. The driver monitoring camera, with the mounting structure attached at the interior portion of the vehicle, and with the mirror head adjusted relative to the mounting structure to set the rearward view of the driver of the vehicle, views at least a driver's head region of the cabin of the vehicle. A near infrared light emitter is accommodated by the mirror head, and the near infrared light emitter moves together and in tandem with the mirror head when, with the mounting structure attached at the interior portion of the vehicle, the mirror head is adjusted relative to the mounting structure to set the rearward view of the driver of the vehicle. The near infrared light emitter is electrically operable to emit near infrared light, and emits near infrared light at least toward the driver's head region (e.g., the near infrared light emitter may emit a beam of near infrared light that has a principal beam axis angled generally toward the driver side of the vehicle). An electronic control unit (ECU) includes electronic circuitry and associated software, including an image processor for processing image data captured by the driver monitoring camera. The ECU processes captured image data of visible light reflected from the driver's head region and near infrared light reflected from the driver's head region. The variable reflectance mirror reflective element is adjustable between operating in (i) a daytime mode, where the variable reflectance mirror reflective element has a first level of visible light transmissivity, and (ii) a nighttime mode, where the variable reflectance mirror reflective element has a second level of visible light transmissivity. The first level of visible light transmissivity is greater than the second level of visible light transmissivity. The driver monitoring system, based on processing at the ECU of image data captured by the driver monitoring system, monitors the eyes of the driver. The vehicular driver monitoring system, based on inability of the vehicular driver monitoring system to monitor the eyes of the driver due to visible light reflections obscuring the driver's head region in the image data captured by the driver monitoring camera while the variable reflectance mirror reflective element is operating in the daytime mode, controls the variable reflectance mirror reflective element to darken or dim toward the nighttime mode to reduce visible light transmissivity of the mirror reflective element and to reduce visible light reflections at the driver's head region in the image data captured by the driver monitoring camera.

These and other objects, advantages, purposes and features of the present invention will become apparent upon review of the following specification in conjunction with the drawings.

DESCRIPTION OF THE PREFERRED EMBODIMENTS

Figure 1:
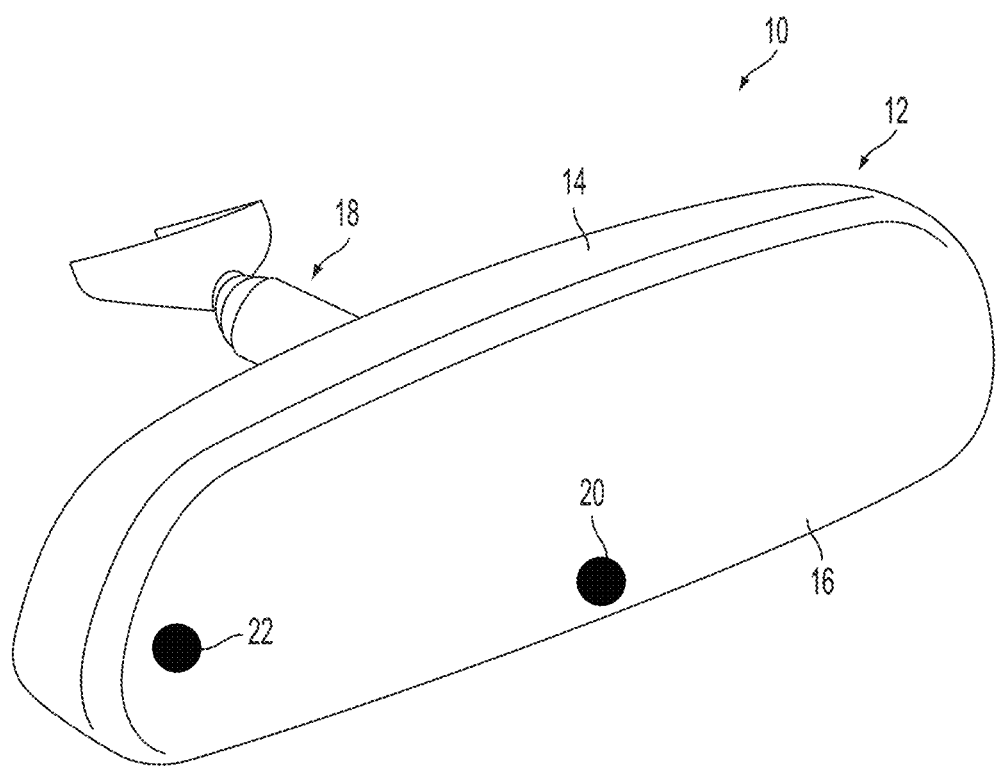
FIG. 1 is a perspective view of an interior rearview mirror assembly that accommodates a driver monitoring camera.

Referring now to the drawings and the illustrative embodiments depicted therein, an interior rearview mirror assembly 10 for a vehicle includes a mirror head 12 that includes a casing 14 and a reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element may comprise a variable reflectance mirror reflective element, such as an electrochromic mirror reflective element, that varies its reflectance responsive to electrical current applied to conductive coatings or layers of the reflective element.

The mirror assembly 10 includes or is associated with a driver monitoring system (DMS) and/or an occupant monitoring system (OMS), with the mirror assembly including a driver/occupant monitoring camera 20 disposed at a back plate (and viewing through an aperture of the back plate)

behind the reflective element 16 and viewing through the reflective element 16 toward at least a head region of the driver of the vehicle. The DMS may include an infrared light (IR light) or near infrared light (near IR light) emitter 22 disposed at the back plate and emitting IR light or near IR light that passes through another aperture of the back plate and through the reflective element 16. Further, the monitoring system includes an electronic control unit (ECU) having electronic circuitry and associated software, including an image processor for processing image data captured by the DMS/OMS camera. Image data captured by the camera may be processed for a head and face direction and position tracking system and/or eye tracking system and/or gesture recognition system.

The near infrared light emitter or near-IR light source may comprise a plurality of near-IR light emitting diodes (LEDs) or near-IR emitting vertical-cavity surface-emitting lasers (VCSEL), such as a bank or cluster or set of light sources such as LEDs or VCSEL lasers. The near-IR light sources may include a first wide field of view (wFOV) light source, a second narrow field of view (nFOV) light source to one side of the wFOV light source, and a third nFOV light source to the other side of the wFOV light source, such as by utilizing aspects of the systems described in International Publication No. WO 2022/187805, which is hereby incorporated herein by reference in its entirety.

The DMS camera and monitoring system and/or head and face direction and/or position tracking systems and/or eye tracking systems and/or gesture recognition systems may utilize aspects of the systems described in U.S. Pat. Nos. 11,582,425; 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/508,351, filed Nov. 14, 2023 , now U.S. Pat No. 12,393,089, and/or U.S. patent application Ser. No. 18/535,183, filed Dec. 11, 2023, now U.S. Pat. No. 12,403,931, and/or U.S. provisional application Ser. No. 63/641,574, filed May 2, 2024, and/or International Publication Nos. WO 2023/220222; WO 2023/034956; WO 2022/241423 and/or WO 2022/187805, which are hereby incorporated herein by reference in their entireties.

For example, the DMS camera and near infrared light emitters are disposed within the mirror head behind a variable reflective mirror reflective element. The mirror reflective element may include a transflective mirror reflector, and the DMS camera may view through the transflective mirror reflector and the near infrared light emitters may emit near infrared light that passes through the transflective mirror reflector. The variable reflective mirror reflective element comprises an electro-optic mirror reflective element, such as an electrochromic mirror reflective element, which has a front glass substrate and a rear glass substrate and a variable light transmissive medium (e.g., an electrochromic medium) sandwiched between the front glass substrate and the rear glass substrate. The transflective mirror reflector is disposed at a side of the rear glass substrate, such as at the third side of the rear glass substrate (that faces or opposes the electrochromic medium) or at the fourth or rear side of the rear glass substrate (that faces away from the electrochromic medium. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

With the DMS camera 20 disposed in the mirror head 12, the camera 20 moves together and in tandem with the mirror head 12 (including the mirror casing 14 and mirror reflective element 16 that pivot at a pivot joint that pivotally connects the mirror head to the mounting structure 18 of the interior rearview mirror assembly that in turn mounts at a windshield or at a headliner of the equipped vehicle), such that, when the driver aligns the mirror head 12 to view rearward, the camera 20 is positioned so as to view at least the driver of the vehicle, such as at least the driver's head, torso, and/or hand positions. The location of the DMS camera 20 and IR LED(s) 22 at the mirror head 12 provide an unobstructed view to the driver. The driver monitoring camera 20 may also provide captured image data for a cabin monitoring system or occupancy monitoring system (OMS) or another separate OMS camera may be disposed at the mirror assembly for the OMS function.

When a driver of the vehicle is wearing glasses (e.g., prescription glasses or sunglasses or other spectacles), a reflection from the glasses or other reflective surface at or near the head region of the driver (e.g., a reflection of the view in front of the driver or a glare light) may interfere with the camera's view of the head region of the driver. That is, the camera may capture image data representative of the driver's head, face and eyes and capture image data representative of the reflected image from the driver's glasses. The reflected image from the driver's glasses may appear overlapped with or in front of the portion of the captured image corresponding to the driver's eyes. Further, glare light may reflect toward the DMS camera and obscure the portion of the image data representative of the driver's head region. Thus, when processing the captured image data, the DMS may be less effective at determining attentiveness of the driver, gaze direction of the driver, and the like. For example, the reflected image and/or glare light may obscure or block the driver's eyes from view of the DMS camera. However, prescription eye glasses, sunglasses and the like typically do not reflect IR light and near IR light. Thus, and as described further below, the DMS may adjust dimming or light filtering of the electrochromic mirror reflective element 16 to reduce or eliminate the camera's ability to view the reflected visible light image from the driver's glasses and improve the camera's ability to view IR light and near IR light reflected from the driver.

Glasses (e.g., sunglasses or spectacles) worn by the driver may include thin film reflective type of glasses (e.g., mirrored sunglasses—with a reflective optical coating on the outside of the lenses). The lenses may be formed of glass or a polymeric material that reflects visible light incident at the outer or first surface of the lens. Even glasses with anti-reflective (AR) lens coatings may still reflect at least a portion of visible light incident at the outer surface of the lens.

Such glasses worn by the driver may have glass lenses (with a first or outer surface reflectivity of around 4% of visible light incident thereat) or plastic lenses formed of polycarbonate, acrylic or the like (with a first or outer surface reflectivity of close to 4% of visible light incident thereat). Also, such glasses may be tinted such as is common with sunglasses. Moreover, sunglasses (e.g., mirrored sunglasses), as well as absorbing visible light incident thereat and passing therethrough, may also have enhanced first surface reflectivity due to the likes of one or more thin film reflective layers deposited at the first or outer surface of the lenses of the mirror-reflecting sunglasses. Normal (non-mirrored) sunglasses may also limit visible light transmission therethrough (via reflecting visible light incident at the lenses and/or via absorbing visible light passing through the lenses) such that the mirror-located DMS camera that is monitoring a driver's eye region will have insufficient light reflecting off the eyes of the driver.

The system, such as during daytime driving conditions, attempts to image visible light reflection off the eyes of the driver. When the driver is wearing spectacles or glasses or sunglasses (particularly glasses or sunglasses with a mirrored first surface), it is more difficult for the camera to image the driver's eyes due to the additional light reflection off the glasses. Thus, the system adjusts operation of the variably transmissive mirror reflective element and optionally may operate the near IR light emitter to enhance the system's ability to image and monitor the driver's eyes.

Figure 2:
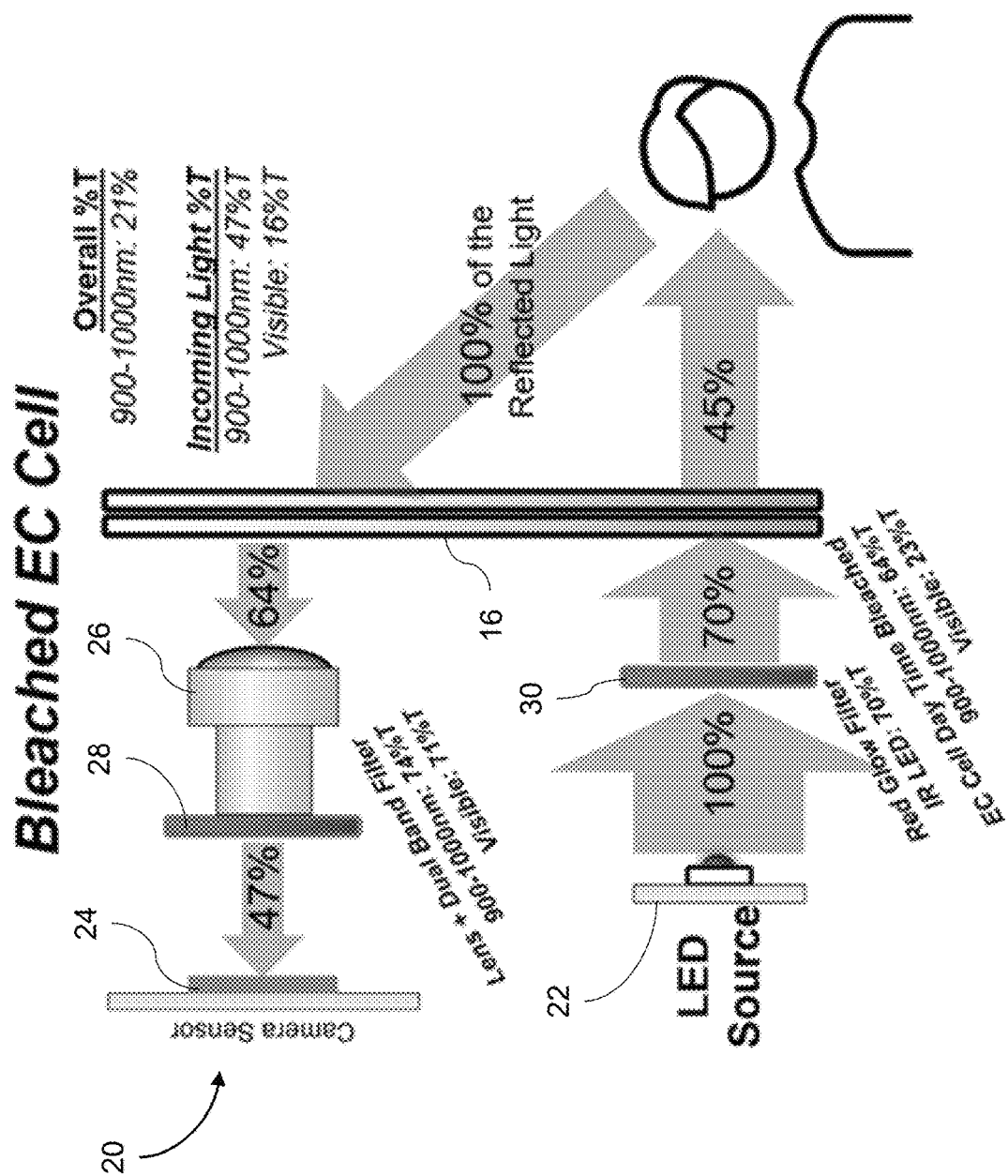
FIG. 2 is a diagram of the interior rearview mirror assembly of FIG. 1, with a variable reflectance mirror reflective element of the interior rearview mirror assembly operating in a daytime mode so that a relatively higher portion of visible light and near infrared light passes through the mirror reflective element.
Figure 3:
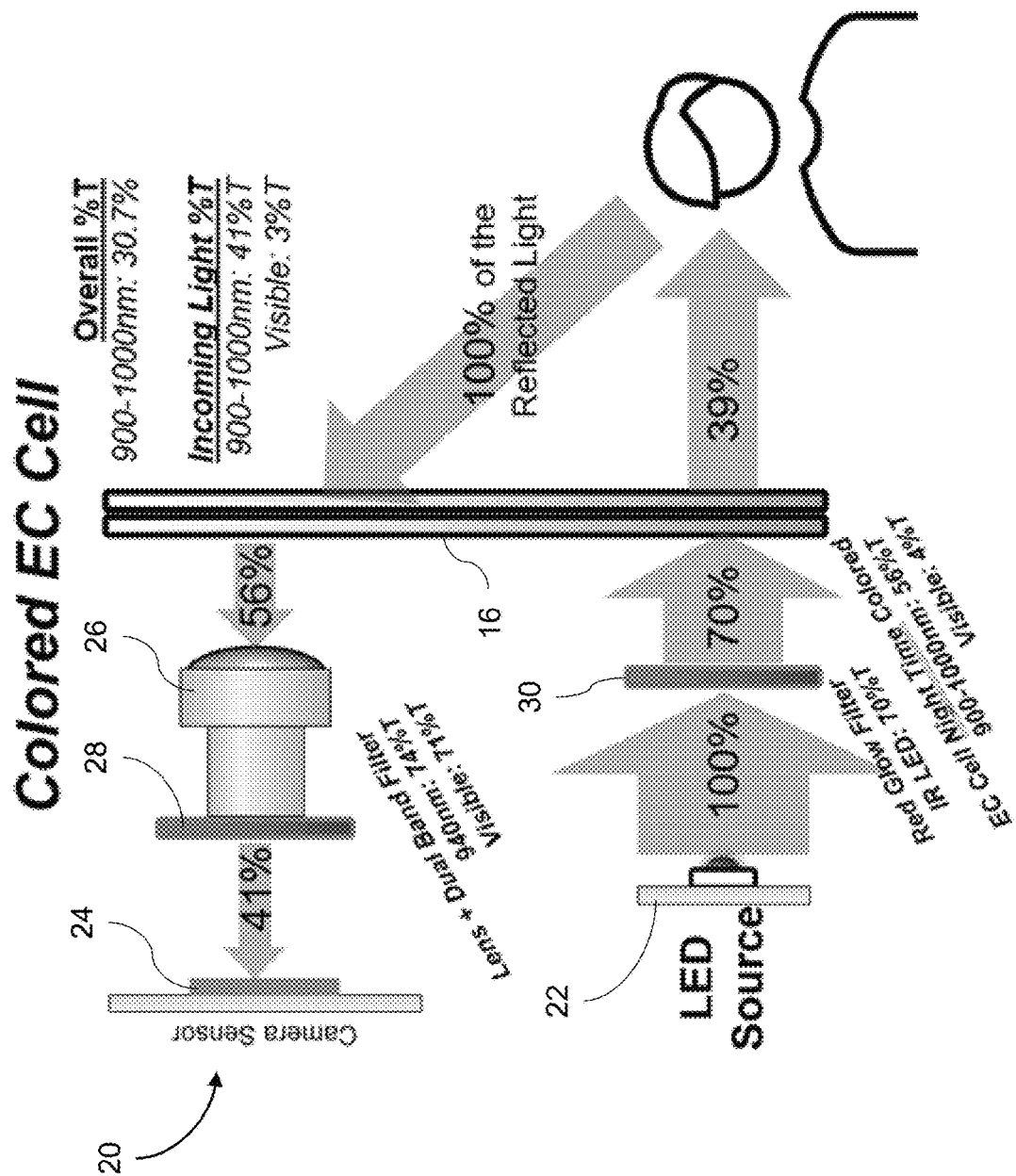
FIG. 3 is a diagram of the interior rearview mirror assembly of FIG. 1, with the variable reflectance mirror reflective element operating in a dimmed or darkened or nighttime mode so that a relatively lower portion of visible light passes through the mirror reflective element.

Referring to FIGS. 2 and 3, the DMS camera 20 includes an image sensor 24 that may capture image data representative of light in the visible light spectrum and light in the IR light spectrum and/or near IR light spectrum (e.g., having frequencies between about 900 nanometers and 1,000 nanometers). The camera 20 may further include a lens or lens barrel 26 having one or more optic elements and a dual band light filter 28, and the camera 20 views through the mirror reflective element 16. The dual band light filter 28 may be disposed between the image sensor 24 and the lens barrel 26, or between respective optic elements of the lens barrel 26. Further, the near IR light emitter 22 emits near IR light that may pass through a red glow IR light filter 30 and the mirror reflective element. Thus, when the camera 20 views the driver of the vehicle and captures image data representative of the driver, the image sensor 24 captures image data representative of light (i.e., visible light and near IR light emitted by the light emitter) reflected from the driver and that passes through the mirror reflective element 16, the lens 26 and the light filter 28.

Each of the mirror reflective element 16, the lens 26, the dual band light filter 28 and the IR light filter 30 allow a portion of visible light and near IR light to pass through and each of the mirror reflective element 16, the lens 26, the dual band light filter 28 and the IR light filter 30 may block or attenuate or reflect a portion of visible light and near IR light incident thereat. When the electrochromic mirror reflective element 16 is set in a default or daytime or bleached mode (FIG. 2), a relatively high portion of the reflected visible light and near IR light is allowed to pass through the mirror reflective element 16. That is, when operating in the daytime mode, the mirror reflective element 16 has a first level of visible light transmissivity and a first level of near IR light transmissivity that are relatively high. For example, the first level of visible light transmissivity may allow visible light to pass through the mirror reflective element at a rate of about 15 percent or more, 23 percent or more, 25 percent or more, 40 percent or more, and the like. The first level of near IR light transmissivity may allow near IR light to pass through the mirror reflective element at a rate of about 45 percent or more, 50 percent or more, 60 percent or more, 64 percent or more, 70 percent or more, and the like. When the camera 20 is viewing the driver with the mirror reflective element 16 in the daytime mode, and a visible light image is reflected from the driver's glasses and near IR light is reflected from the driver, the reflected visible light image may appear more visible in the captured image data than the reflected near IR light, thus rendering the captured image data less reliable for the DMS due to the reflected image from the driver's glasses.

When the electrochromic mirror reflective element 16 is set in a dimmed or darkened or nighttime or tinted or colored mode (FIG. 3), less visible light is allowed to pass through the mirror reflective element 16 while at least a portion of near IR light is allowed to pass through the mirror reflective element 16. In other words, when operating in the nighttime mode, the mirror reflective element 16 has a second level of visible light transmissivity that is lower than the first level of visible light transmissivity and a second level of near IR light transmissivity that is less than the first level of near IR light transmissivity. The difference between the first and second levels of visible light transmissivity may be greater than the difference between the first and second levels of near IR light transmissivity. For example, the second level of visible light transmissivity may allow visible light to pass through the mirror reflective element at a rate of about 2 percent or more, 4 percent or more, 5 percent or more, 10 percent or more, 15 percent or more, and the like. The second level of near IR light transmissivity may allow near IR light to pass through the mirror reflective element at a rate of about 60 percent or more, 56 percent or more, 50 percent or more, 40 percent or more, and the like. Thus, when the camera 20 is viewing the driver with the mirror reflective element 16 in the tinted mode and near IR light is reflected from the driver, the reflected image from the driver's glasses may not be visible or appear less visible than the reflected near IR light, such that the captured image data is more reliable for driver monitoring. Further, the mirror reflective element 16 may be operable at a plurality of different levels of darkening or dimming between the daytime mode and the nighttime mode based on the electric current applied at the electrochromic mirror reflective element 16. In other words, the variable reflectance mirror reflective element 16 may be adjusted to different degrees, such as based on the level or intensity of visible light and near IR light passing through the mirror reflective element 16 and captured by the driver monitoring camera 20.

In the illustrated example of FIGS. 2 and 3, the IR light filter 30 allows about 70 percent of near IR light emitted from the near IR light emitter 22 to pass through to the mirror reflective element 16. When the electrochromic mirror reflective element 16 is in the daytime mode or bleached mode (FIG. 2), the mirror reflective element 16 allows about 64 percent of near IR light and about 23 percent of visible light to pass through the mirror reflective element 16. Thus, with the mirror reflective element 16 in the daytime mode, about 45 percent of near IR light emitted by the light emitter 22 may pass through the mirror reflective element 16 to be reflected from the driver. The lens 26 and the dual band filter 28 may allow about 74 percent of near IR light and about 71 percent of visible light to pass from the mirror reflective element 16 to the image sensor 24. Thus, with the mirror reflective element 16 in the daytime mode, about 47 percent of incoming near IR light and about 16 percent of visible light is passed through to the image sensor 24. The overall transmissivity of near IR light emitted by the light emitter 22 that is captured by the camera 20 may be about 21 percent.

When the electrochromic mirror reflective element 16 is in the nighttime or colored mode (FIG. 3), the mirror reflective element 16 allows about 56 percent of near IR light and about 4 percent of visible light to pass through the mirror reflective element 16. Thus, with the mirror reflective element 16 in the nighttime mode, about 39 percent of near IR light emitted by the light emitter 22 may pass through the mirror reflective element 16 to be reflected from the driver. With the reflected light from the driver passing back through the mirror reflective element 16 and through the lens 26 and the dual band filter 28, about 41 percent of incoming near IR light and about 3 percent of visible light is passed through to the image sensor 24. The overall transmissivity of near IR light emitted by the light emitter 22 that is captured by the camera 20 may be about 16 percent.

Thus, during daytime driving, to reduce the effect of reflected images from the driver's glasses on the captured image data, the DMS may adjust dimming of the electrochromic mirror reflective element 16 toward or to the nighttime mode. Because visible light transmissivity of the mirror reflective element 16 is greatly reduced while near IR light transmissivity of the mirror reflective element 16 is reduced to a lesser degree in the nighttime mode, the camera may view the near IR light reflected from the driver and driver's eyes rather than the visible light reflected from the driver's glasses. That is, the DMS adjusts operation of the mirror reflective element between the daytime mode and the nighttime mode (and optionally to one or more levels of dimming between the daytime mode and the nighttime mode) to reduce the level or intensity of visible light that passes through the mirror reflective element 16 to be viewed by the DMS camera 20. When the level of visible light passing through the mirror reflective element 16 is reduced, the DMS may rely more heavily on captured image data of near IR light to perform driver monitoring. Optionally, when adjusting dimming of the electrochromic mirror reflective element 16 toward or to the nighttime mode to reduce glare off the glasses worn by the driver, the system may also operate the near IR light emitter to increase near IR illumination at the driver's eyes, and thus to increase the system's ability to monitor the driver's eyes.

The system may adjust the mirror reflective element to be in the nighttime mode, such as in response to determination that a reflected image is obscuring the camera's view of the driver's eyes or in response to a determined ambient light level or glare light level at the mirror assembly being greater than a threshold ambient light level or threshold glare light level. When adjusting operation of the mirror reflective element 16, the system may dim or darken the mirror reflective element only to a degree necessary to reduce or eliminate the reflections obscuring the camera's view of the driver. For example, in response to determination that the DMS is unable to determine a gaze direction of the driver, the system may incrementally adjust the level of dimming of the mirror reflective element from the daytime mode toward the nighttime mode and set the level of dimming of the mirror reflective element when the DMS is able to determine the gaze direction of the driver.

Optionally, the system may adjust dimming of the mirror reflective element to reduce transmissivity of visible light through the mirror reflective element in response to the determined attentiveness of the driver being below a threshold level of attentiveness. Thus, when the system determines that the driver is being above the threshold level of inattentive, the system adjusts dimming to rely more on the captured near IR light, which may result in a more accurate determination of the attentiveness of the driver.

Further, because visibility of the rearward view provided by the mirror reflective element and/or visibility of images displayed at a video display screen of the mirror assembly may be reduced during daytime driving conditions when the mirror is switched to the nighttime mode, the system may dim or darken the mirror reflective element episodically to check the attentiveness of the driver. For example, the system may adjust dimming of the mirror reflective element once every five minutes, once every ten minutes, once every hour and the like. Optionally, the system may adjust the mirror reflective element at a rate that is imperceptible or not noticeable to the driver of the vehicle so as to capture improved DMS images without noticeably affecting visibility of the mirror reflective element. For example, the system may adjust the mirror reflective element for periods of less than a second at a time, less than half a second at a time, and the like.

Optionally, the mirror cell may be partially dimmed or partially darkened to a level where the DMS can monitor the driver's eyes but not to the level of the nighttime mode. The degree of dimming or darkening may be adjusted responsive to the ambient light conditions or to the degree of reflected light or the like. Optionally, only a portion of the mirror cell that is in front of the camera may be locally darkened or dimmed to provide the darkened or dimmed cell at the camera, while not affecting darkening or dimming of the rest of the mirror cell, such as by utilizing aspects of the mirrors and systems described in U.S. Pat. Nos. 9,598,016; 8,654,433 and/or 8,508,383, which are hereby incorporated herein by reference in their entireties.

Thus, to help detect the driver's eyes during the day and when the driver is wearing glasses, the system may color or tint or darken the electrochromic cell of the mirror reflective element to filter out the reflective visible light image that can be seen on the driver's glasses or non-IR blocking sunglasses. During the day, the DMS camera typically will view or capture an image of the driver's eye that is illuminated by the IR light emitters and the sun. However, if the driver is wearing glasses, there may also be an image of the scene in front of the driver that is directly on top of the eye caused by the reflection off the glass surface. Darkening the electrochromic cell will reduce the visibility of the reflected scene image because the reflected scene image will include primarily visible light and little to no light from the IR light emitter. As the electrochromic mirror reflective element is darkened, the visible light transmissivity of the mirror reflective element reduces, such as to about 18 percent of a daytime or bleached state, and the IR light transmissivity of the mirror reflective element reduces by a lesser degree, such as to about 87 percent of the daytime or bleached state.

The interior mirror assembly may comprise a dual-mode interior rearview video mirror that can switch from a traditional reflection mode to a live-video display mode, such as by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety. The operating mode of the mirror and video display screen may be selected by flipping the mirror head upward or downward (e.g., via a toggle located at the mirror head) or responsive to another user input. When the mirror is operating in the mirror mode, the video display screen is deactivated and rendered covert by the mirror reflective element, and the driver views rearward via reflection of light incident at the mirror reflective element. When the mirror is operating in the display mode, the video display screen is operated to display video images that are viewable through the mirror reflective element by the driver of the vehicle.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529, 108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827, 913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween.

Changes and modifications in the specifically described embodiments may be carried out without departing from the principles of the present invention, which is intended to be limited only by the scope of the appended claims as interpreted according to the principles of patent law.

The invention claimed is:

1. A vehicular driver monitoring system, the vehicular driver monitoring system comprising:
   a vehicular interior rearview mirror assembly comprising a mirror head adjustably attached at a mounting structure, the mounting structure configured to mount the vehicular interior rearview mirror assembly at an interior portion of an interior cabin of a vehicle equipped with the vehicular driver monitoring system;
   wherein the mirror head accommodates a variable reflectance mirror reflective element;
   wherein the variable reflectance mirror reflective element comprises a variable light-transmissive medium;
   a driver monitoring camera accommodated by the mirror head, wherein the driver monitoring camera views through the variable light-transmissive medium of the variable reflectance mirror reflective element;
   a near infrared light emitter accommodated by the mirror head, wherein the near infrared light emitter is electrically operable to emit near infrared light;
   wherein the driver monitoring camera and the near infrared light emitter move together and in tandem with the mirror head when, with the vehicular interior rearview mirror assembly mounted at the interior portion of the interior cabin of the vehicle, the mirror head is adjusted relative to the mounting structure to set a rearward view of a driver of the vehicle;
   wherein, with the vehicular interior rearview mirror assembly mounted at the interior portion of the interior cabin of the vehicle, and with the mirror head adjusted relative to the mounting structure to set the rearward view of the driver of the vehicle, the driver monitoring camera views at least a driver head region within the interior cabin of the vehicle;
   wherein, with the vehicular interior rearview mirror assembly mounted at the interior portion of the interior cabin of the vehicle, and with the mirror head adjusted relative to the mounting structure to set the rearward view of the driver of the vehicle, and when the near infrared light emitter is electrically operated to emit near infrared light, the near infrared light emitter emits near infrared light that illuminates at least the driver head region;
   an electronic control unit (ECU);
   wherein the ECU comprises electronic circuitry and associated software, and wherein the electronic circuitry of the ECU comprises an image processor for processing image data captured by the driver monitoring camera;
   wherein, with the vehicular interior rearview mirror assembly mounted at the interior portion of the interior cabin of the vehicle, the vehicular driver monitoring system, responsive at least in part to processing at the ECU of the image data captured by the driver monitoring camera, monitors the eyes of the driver;
   wherein the image data captured by the driver monitoring camera includes (i) image data representative of visible light reflected from the driver's head and (ii) image data representative of near infrared light reflected from the driver's head;
   wherein the variable reflectance mirror reflective element is adjustable between operating in (i) a first mode, where the variable reflectance mirror reflective element comprises a first level of visible light transmissivity through the variable reflectance mirror reflective element, and (ii) a second mode, where the variable reflectance mirror reflective element comprises a second level of visible light transmissivity through the variable reflectance mirror reflective element, and wherein the first level of visible light transmissivity is greater than the second level of visible light transmissivity; and
   wherein, with the vehicular interior rearview mirror assembly mounted at the interior portion of the interior cabin of the vehicle, and with the variable reflectance mirror reflective element operating in the first mode, and with the driver wearing glasses, and responsive to determination, via processing at the ECU of the image data captured by the driver monitoring camera, that visible light reflecting off the glasses worn by the driver is obscuring the camera's view of the eyes of the driver, the vehicular driver monitoring system controls the variable reflectance mirror reflective element to reduce visible light transmissivity through the variable reflectance mirror reflective element toward the second level of visible light transmissivity through the variable reflectance mirror reflective element to reduce visible light reflections at the glasses worn by the driver as captured in the image data captured by the driver monitoring camera.

2. The vehicular driver monitoring system of claim 1, wherein, with the vehicular interior rearview mirror assembly mounted at the interior portion of the interior cabin of the vehicle, the variable reflectance mirror reflective element (i) operates in the first mode responsive to ambient light being greater than a threshold level and (ii) operates in the second mode responsive to ambient light being less than the threshold level.

3. The vehicular driver monitoring system of claim 2, wherein the near infrared light emitter is electrically operated at least when the variable reflectance mirror reflective element operates in the second mode.

4. The vehicular driver monitoring system of claim 1, wherein, when the vehicular driver monitoring system controls the variable reflectance mirror reflective element to reduce visible light transmissivity through the variable reflectance mirror reflective element, the vehicular driver monitoring system electrically operates the near infrared light emitter to emit near infrared light.

5. The vehicular driver monitoring system of claim 1, wherein, with the vehicular interior rearview mirror assembly mounted at the interior portion of the interior cabin of the vehicle, and with the variable reflectance mirror reflective element operating in the first mode, the vehicular driver monitoring system monitors the eyes of the driver based primarily on processing at the ECU of captured image data representative of visible light reflected from the driver's head.

6. The vehicular driver monitoring system of claim 1, wherein, with the vehicular interior rearview mirror assembly mounted at the interior portion of the interior cabin of the vehicle, and with the variable reflectance mirror reflective element operating in the second mode, the vehicular driver monitoring system monitors the eyes of the driver based primarily on processing at the ECU of captured image data representative of near infrared light reflected from the driver's head.

7. The vehicular driver monitoring system of claim 1, wherein the first level of visible light transmissivity comprises at least fifteen percent visible light transmissivity.

8. The vehicular driver monitoring system of claim 1, wherein the second level of visible light transmissivity comprises less than five percent visible light transmissivity.

9. The vehicular driver monitoring system of claim 1, wherein, with the variable reflectance mirror reflective element operating in the first mode, the variable reflectance mirror reflective element comprises a first level of near infrared light transmissivity through the variable reflectance mirror reflective element, and wherein, with the variable reflectance mirror reflective element operating in the second mode, the variable reflectance mirror reflective element comprises a second level of near infrared light transmissivity through the variable reflectance mirror reflective element, and wherein the first level of near infrared light transmissivity is greater than the second level of near infrared light transmissivity.

10. The vehicular driver monitoring system of claim 9, wherein the first level of near infrared light transmissivity comprises at least 45 percent near infrared light transmissivity.

11. The vehicular driver monitoring system of claim 9, wherein the second level of near infrared light transmissivity comprises at least 40 percent near infrared light transmissivity.

12. The vehicular driver monitoring system of claim 9, wherein a difference between the first level of visible light transmissivity and the second level of visible light transmissivity is greater than a difference between the first level of near infrared light transmissivity and the second level of near infrared light transmissivity.

13. The vehicular driver monitoring system of claim 1, wherein, with the vehicular interior rearview mirror assembly mounted at the interior portion of the interior cabin of the vehicle, and based on processing at the ECU of the image data captured by the driver monitoring camera, the vehicular driver monitoring system monitors the eyes of the driver to determine at least one selected from the group consisting of (i) driver gaze direction, (ii) driver attentiveness and (iii) driver drowsiness.

14. The vehicular driver monitoring system of claim 1, wherein, with the vehicular interior rearview mirror assembly mounted at the interior portion of the interior cabin of the vehicle, the vehicular driver monitoring system determines that visible light reflecting off the glasses worn by the driver is obscuring the camera's view of the eyes of the driver responsive to visible light intensity of visible light reflecting from an eye region of the head of the driver being greater than a threshold level.

15. The vehicular driver monitoring system of claim 1, wherein, when the vehicular driver monitoring system controls the variable reflectance mirror reflective element to reduce visible light transmissivity toward the second level of visible light transmissivity, the vehicular driver monitoring system adjusts the variable reflectance mirror reflective element from operating in the first mode to operating in the second mode.

16. The vehicular driver monitoring system of claim 1, wherein, when the vehicular driver monitoring system controls the variable reflectance mirror reflective element to reduce visible light transmissivity toward the second level of visible light transmissivity, the vehicular driver monitoring system adjusts the variable reflectance mirror reflective element from operating in the first mode to operating in an intermediate mode, and wherein, while the variable reflectance mirror reflective element is operating in the intermediate mode, the variable reflectance mirror reflective element comprises a third level of visible light transmissivity through the variable reflectance mirror reflective element, and wherein the third level of visible light transmissivity is less the first level of visible light transmissivity and greater than the second level of visible light transmissivity.

17. The vehicular driver monitoring system of claim 1, wherein, with the vehicular interior rearview mirror assembly mounted at the interior portion of the interior cabin of the vehicle, the vehicular driver monitoring system determines, via processing at the ECU of the image data captured by the driver monitoring camera, that the driver of the vehicle is wearing visible light reflecting glasses.

18. The vehicular driver monitoring system of claim 1, wherein the near infrared light emitter, when electrically operated, emits near infrared light that passes through the variable reflectance mirror reflective element.

19. The vehicular driver monitoring system of claim 1, wherein the variable reflectance mirror reflective element has a transflective mirror reflector, and wherein the camera views through the transflective mirror reflector and the variable light-transmissive medium of the variable reflectance mirror reflective element, and wherein the near infrared light emitter, when electrically operated, emits near infrared light that passes through the transflective mirror reflector and the variable light-transmissive medium of the variable reflectance mirror reflective element.

20. The vehicular driver monitoring system of claim 1, wherein the near infrared light emitter comprises a plurality of individual near infrared light-emitting sources.

21. A vehicular driver monitoring system, the vehicular driver monitoring system comprising:
   a vehicular interior rearview mirror assembly comprising a mirror head adjustably attached at a mounting structure, the mounting structure configured to mount the vehicular interior rearview mirror assembly at an interior portion of an interior cabin of a vehicle equipped with the vehicular driver monitoring system;
   wherein the mirror head accommodates a variable reflectance mirror reflective element;
   wherein the variable reflectance mirror reflective element comprises a variable light-transmissive medium;
   a driver monitoring camera accommodated by the mirror head, wherein the driver monitoring camera views through the variable light-transmissive medium of the variable reflectance mirror reflective element;
   a near infrared light emitter accommodated by the mirror head, wherein the near infrared light emitter is electrically operable to emit near infrared light;
   wherein the driver monitoring camera and the near infrared light emitter move together and in tandem with the mirror head when, with the vehicular interior rearview mirror assembly mounted at the interior portion of the interior cabin of the vehicle, the mirror head is adjusted relative to the mounting structure to set a rearward view of a driver of the vehicle;
   wherein, with the vehicular interior rearview mirror assembly mounted at the interior portion of the interior cabin of the vehicle, and with the mirror head adjusted relative to the mounting structure to set the rearward view of the driver of the vehicle, the driver monitoring camera views at least a driver head region within the interior cabin of the vehicle;
   wherein, with the vehicular interior rearview mirror assembly mounted at the interior portion of the interior cabin of the vehicle, and with the mirror head adjusted relative to the mounting structure to set the rearward view of the driver of the vehicle, and when the near infrared light emitter is electrically operated to emit near infrared light, the near infrared light emitter emits near infrared light that illuminates at least the driver head region;
   an electronic control unit (ECU);
   wherein the ECU comprises electronic circuitry and associated software, and wherein the electronic circuitry of the ECU comprises an image processor for processing image data captured by the driver monitoring camera;
   wherein, with the vehicular interior rearview mirror assembly mounted at the interior portion of the interior cabin of the vehicle, the vehicular driver monitoring system, responsive at least in part to processing at the ECU of the image data captured by the driver monitoring camera, monitors the eyes of the driver;
   wherein the image data captured by the driver monitoring camera includes (i) image data representative of visible light reflected from the driver's head and (ii) image data representative of near infrared light reflected from the driver's head;
   wherein the variable reflectance mirror reflective element is adjustable between operating in (i) a first mode, where the variable reflectance mirror reflective element comprises a first level of visible light transmissivity through the variable reflectance mirror reflective element, and (ii) a second mode, where the variable reflectance mirror reflective element comprises a second level of visible light transmissivity through the variable reflectance mirror reflective element, and wherein the first level of visible light transmissivity is greater than the second level of visible light transmissivity;
   wherein, with the vehicular interior rearview mirror assembly mounted at the interior portion of the interior cabin of the vehicle, and with the variable reflectance mirror reflective element operating in the first mode, the vehicular driver monitoring system monitors the eyes of the driver based primarily on processing at the ECU of captured image data representative of visible light reflected from the driver's head;
   wherein, with the vehicular interior rearview mirror assembly mounted at the interior portion of the interior cabin of the vehicle, and with the variable reflectance mirror reflective element operating in the second mode, the vehicular driver monitoring system monitors the eyes of the driver based primarily on processing at the ECU of captured image data representative of near infrared light reflected from the driver's head;
   wherein, with the vehicular interior rearview mirror assembly mounted at the interior portion of the interior cabin of the vehicle, and with the variable reflectance mirror reflective element operating in the first mode, and with the driver wearing glasses, and responsive to determination, via processing at the ECU of the image data captured by the driver monitoring camera, that visible light reflecting off the glasses worn by the driver is obscuring the camera's view of the eyes of the driver, the vehicular driver monitoring system controls the variable reflectance mirror reflective element to reduce visible light transmissivity through the variable reflectance mirror reflective element toward the second level of visible light transmissivity through the variable reflectance mirror reflective element to reduce visible light reflections at the glasses worn by the driver as captured in the image data captured by the driver monitoring camera; and
   wherein, when the vehicular driver monitoring system controls the variable reflectance mirror reflective element to reduce visible light transmissivity through the variable reflectance mirror reflective element, the vehicular driver monitoring system electrically operates the near infrared light emitter to emit near infrared light.

22. The vehicular driver monitoring system of claim 21, wherein, with the vehicular interior rearview mirror assembly mounted at the interior portion of the interior cabin of the vehicle, the variable reflectance mirror reflective element (i) operates in the first mode responsive to ambient light being greater than a threshold level and (ii) operates in the second mode responsive to ambient light being less than the threshold level.

23. The vehicular driver monitoring system of claim 22, wherein the near infrared light emitter is electrically operated at least when the variable reflectance mirror reflective element operates in the second mode.

24. The vehicular driver monitoring system of claim 21, wherein, with the variable reflectance mirror reflective element operating in the first mode, the variable reflectance mirror reflective element comprises a first level of near infrared light transmissivity through the variable reflectance mirror reflective element, and wherein, with the variable reflectance mirror reflective element operating in the second mode, the variable reflectance mirror reflective element comprises a second level of near infrared light transmissivity through the variable reflectance mirror reflective element, and wherein the first level of near infrared light transmissivity is greater than the second level of near infrared light transmissivity.

25. The vehicular driver monitoring system of claim 24, wherein a difference between the first level of visible light transmissivity and the second level of visible light transmissivity is greater than a difference between the first level of near infrared light transmissivity and the second level of near infrared light transmissivity.

26. The vehicular driver monitoring system of claim 21, wherein, when the vehicular driver monitoring system controls the variable reflectance mirror reflective element to reduce visible light transmissivity toward the second level of visible light transmissivity, the vehicular driver monitoring system adjusts the variable reflectance mirror reflective element from operating in the first mode to operating in the second mode.

27. The vehicular driver monitoring system of claim 21, wherein, when the vehicular driver monitoring system controls the variable reflectance mirror reflective element to reduce visible light transmissivity toward the second level of visible light transmissivity, the vehicular driver monitoring system adjusts the variable reflectance mirror reflective element from operating in the first mode to operating in an intermediate mode, and wherein, while the variable reflectance mirror reflective element is operating in the intermediate mode, the variable reflectance mirror reflective element comprises a third level of visible light transmissivity through the variable reflectance mirror reflective element, and wherein the third level of visible light transmissivity is less the first level of visible light transmissivity and greater than the second level of visible light transmissivity.

28. A vehicular driver monitoring system, the vehicular driver monitoring system comprising:
   a vehicular interior rearview mirror assembly comprising a mirror head adjustably attached at a mounting structure, the mounting structure configured to mount the vehicular interior rearview mirror assembly at an interior portion of an interior cabin of a vehicle equipped with the vehicular driver monitoring system;
   wherein the mirror head accommodates a variable reflectance mirror reflective element;
   wherein the variable reflectance mirror reflective element comprises a variable light-transmissive medium;
   a driver monitoring camera accommodated by the mirror head, wherein the driver monitoring camera views through the variable light-transmissive medium of the variable reflectance mirror reflective element;
   a near infrared light emitter accommodated by the mirror head, wherein the near infrared light emitter comprises a plurality of individual near infrared light-emitting sources, and wherein the near infrared light emitter is electrically operable to emit near infrared light;
   wherein the driver monitoring camera and the near infrared light emitter move together and in tandem with the mirror head when, with the vehicular interior rearview mirror assembly mounted at the interior portion of the interior cabin of the vehicle, the mirror head is adjusted relative to the mounting structure to set a rearward view of a driver of the vehicle;
   wherein, with the vehicular interior rearview mirror assembly mounted at the interior portion of the interior cabin of the vehicle, and with the mirror head adjusted relative to the mounting structure to set the rearward view of the driver of the vehicle, the driver monitoring camera views at least a driver head region within the interior cabin of the vehicle;
   wherein, with the vehicular interior rearview mirror assembly mounted at the interior portion of the interior cabin of the vehicle, and with the mirror head adjusted relative to the mounting structure to set the rearward view of the driver of the vehicle, and when the near infrared light emitter is electrically operated to emit near infrared light, the near infrared light emitter emits near infrared light that illuminates at least the driver head region;
   an electronic control unit (ECU);
   wherein the ECU comprises electronic circuitry and associated software, and wherein the electronic circuitry of the ECU comprises an image processor for processing image data captured by the driver monitoring camera;
   wherein, with the vehicular interior rearview mirror assembly mounted at the interior portion of the interior cabin of the vehicle, the vehicular driver monitoring system, responsive at least in part to processing at the ECU of the image data captured by the driver monitoring camera, monitors the eyes of the driver;
   wherein the image data captured by the driver monitoring camera includes (i) image data representative of visible light reflected from the driver's head and (ii) image data representative of near infrared light reflected from the driver's head;
   wherein the variable reflectance mirror reflective element is adjustable between operating in (i) a first mode, where the variable reflectance mirror reflective element comprises a first level of visible light transmissivity through the variable reflectance mirror reflective element, and (ii) a second mode, where the variable reflectance mirror reflective element comprises a second level of visible light transmissivity through the variable reflectance mirror reflective element, and wherein the first level of visible light transmissivity is greater than the second level of visible light transmissivity;
   wherein, with the vehicular interior rearview mirror assembly mounted at the interior portion of the interior cabin of the vehicle, the variable reflectance mirror reflective element (i) operates in the first mode responsive to ambient light being greater than a threshold level and (ii) operates in the second mode responsive to ambient light being less than the threshold level;
   wherein the near infrared light emitter is electrically operated at least when the variable reflectance mirror reflective element operates in the second mode; and
   wherein, with the vehicular interior rearview mirror assembly mounted at the interior portion of the interior cabin of the vehicle, and with the variable reflectance mirror reflective element operating in the first mode, and with the driver wearing glasses, and responsive to determination, via processing at the ECU of the image data captured by the driver monitoring camera, that visible light reflecting off the glasses worn by the driver is obscuring the camera's view of the eyes of the driver, the vehicular driver monitoring system adjusts the variable reflectance mirror reflective element from operating in the first mode to operating in the second mode to reduce visible light transmissivity through the variable reflectance mirror reflective element toward the second level of visible light transmissivity through the variable reflectance mirror reflective element to reduce visible light reflections at the glasses worn by the driver as captured in the image data captured by the driver monitoring camera.

29. The vehicular driver monitoring system of claim 28, wherein, with the vehicular interior rearview mirror assembly mounted at the interior portion of the interior cabin of the vehicle, and with the variable reflectance mirror reflective element operating in the first mode, the vehicular driver monitoring system monitors the eyes of the driver based primarily on processing at the ECU of captured image data representative of visible light reflected from the driver's head.

30. The vehicular driver monitoring system of claim 28, wherein, with the vehicular interior rearview mirror assembly mounted at the interior portion of the interior cabin of the vehicle, and with the variable reflectance mirror reflective element operating in the second mode, the vehicular driver monitoring system monitors the eyes of the driver based primarily on processing at the ECU of captured image data representative of near infrared light reflected from the driver's head.

31. The vehicular driver monitoring system of claim 28, wherein, with the vehicular interior rearview mirror assembly mounted at the interior portion of the interior cabin of the vehicle, and based on processing at the ECU of the image data captured by the driver monitoring camera, the vehicular driver monitoring system monitors the eyes of the driver to determine at least one selected from the group consisting of (i) driver gaze direction, (ii) driver attentiveness and (iii) driver drowsiness.

32. The vehicular driver monitoring system of claim 28, wherein, with the vehicular interior rearview mirror assembly mounted at the interior portion of the interior cabin of the vehicle, the vehicular driver monitoring system determines that visible light reflecting off the glasses worn by the driver is obscuring the camera's view of the eyes of the driver responsive to visible light intensity of visible light reflecting from an eye region of the head of the driver being greater than a threshold level.

* * * * *